US006797422B2

(12) United States Patent
Fan et al.

(10) Patent No.: US 6,797,422 B2
(45) Date of Patent: Sep. 28, 2004

(54) AIR-BREATHING DIRECT METHANOL FUEL CELL WITH METAL FOAM CURRENT COLLECTORS

(75) Inventors: Qinbai Fan, Chicago, IL (US); Renato Platon, Lemont, IL (US); Siem Le, Des Plaines, IL (US); Renata Kot, Norridge, IL (US)

(73) Assignee: Gas Technology Institute, Des Plaines, IL (US)

( * ) Notice: Subject to any disclaimer, the term of this patent is extended or adjusted under 35 U.S.C. 154(b) by 239 days.

(21) Appl. No.: 09/946,192

(22) Filed: Sep. 5, 2001

(65) Prior Publication Data

US 2002/0098402 A1 Jul. 25, 2002

Related U.S. Application Data

(60) Provisional application No. 60/264,137, filed on Jan. 25, 2001.

(51) Int. Cl.[7] .............................................. H01M 8/10
(52) U.S. Cl. ............................ 429/34; 429/30; 429/33; 429/38; 429/39
(58) Field of Search ............................ 429/30, 31, 34, 429/35, 36

(56) References Cited

U.S. PATENT DOCUMENTS

| | | |
|---|---|---|
| 3,933,520 A | 1/1976 | Gay et al. |
| 4,262,063 A | 4/1981 | Kudo et al. |
| 4,390,603 A | 6/1983 | Kawana et al. |
| 4,562,123 A | 12/1985 | Shimizu et al. |
| H16 H | 1/1986 | Kaun |
| 4,769,297 A | 9/1988 | Reiser et al. |
| 5,277,996 A | 1/1994 | Marchetti et al. |
| 5,322,744 A | 6/1994 | Koseki |
| 5,366,818 A | 11/1994 | Wilkinson et al. |
| 5,395,705 A | 3/1995 | Door et al. |
| 5,460,896 A | 10/1995 | Takada et al. |
| 5,464,700 A | 11/1995 | Steck et al. |
| 5,514,486 A * | 5/1996 | Wilson .......................... 429/30 |
| 5,573,866 A | 11/1996 | Van Dine et al. |
| 5,595,834 A * | 1/1997 | Wilson et al. ................ 429/30 |
| 5,688,613 A | 11/1997 | Li et al. |
| 5,865,968 A | 2/1999 | Denton et al. |
| 5,869,201 A | 2/1999 | Marchetti |
| 5,869,202 A | 2/1999 | Marchetti |
| 5,904,740 A | 5/1999 | Davis |
| 6,001,500 A * | 12/1999 | Bass et al. ..................... 429/31 |
| 6,007,934 A | 12/1999 | Auer et al. |
| 6,010,606 A | 1/2000 | Denton et al. |
| 6,022,634 A | 2/2000 | Ramunni et al. |
| 6,268,077 B1 * | 7/2001 | Kelley et al. .................. 429/33 |
| 6,368,751 B1 * | 4/2002 | Yao et al. ..................... 429/235 |
| 6,423,437 B1 * | 7/2002 | Kenyon et al. ................ 429/32 |
| 6,440,594 B1 * | 8/2002 | Kindler et al. ................ 429/13 |
| 6,458,479 B1 * | 10/2002 | Ren et al. ...................... 429/33 |
| 6,492,047 B1 * | 12/2002 | Peled et al. ................... 429/30 |
| 6,492,052 B2 * | 12/2002 | Ren ............................. 429/33 |

FOREIGN PATENT DOCUMENTS

JP 11003725 1/1999

\* cited by examiner

*Primary Examiner*—Michael Barr
*Assistant Examiner*—Monique Wills
(74) *Attorney, Agent, or Firm*—Mark E. Fejer

(57) ABSTRACT

A method and apparatus for generating electricity by direct oxidation of methanol in which methanol is passed through a porous anode current collector to contact the anode electrode of a polymer electrolyte membrane fuel cell, an oxidant is passed at atmospheric pressure through a porous cathode current collector which acts as an air diffuser to contact the cathode electrode and the methanol is directly oxidized, producing water which is removed through the cathode current collector, carbon dioxide and electricity.

26 Claims, 4 Drawing Sheets

AIR-BREATHING DIRECT METHANOL FUEL CELL WITH METAL FOAM CURRENT COLLECTORS

CROSS-REFERENCE TO RELATED APPLICATION

This application claims the benefit of provisional U.S. patent application Ser. No. 60/264,137, filed Jan. 25, 2001.

BACKGROUND OF THE INVENTION

1. Field of the Invention

This invention relates to polymer electrolyte membrane fuel cells suitable for direct oxidation of liquid fuels. More particularly, this invention relates to direct methanol fuel cells which eliminate the need for pumps, blowers and humidifiers in order to operate.

2. Description of Related Art

Direct methanol polymer electrolyte membrane fuel cells are prime candidates for both vehicular and stationary uses due to their inherent simplicity (no external reformers) and potential high energy densities (liquid fuels). In addition, direct methanol polymer electrolyte membrane fuel cells have the potential for replacing rechargeable batteries due to the possibility of a zero recharge time. However, the current state of the art in direct methanol polymer electrolyte membrane fuel cells requires external means, such as pumps and blowers for introducing reactants into and removing reaction products from the fuel cell. For example, U.S. Pat. No. 5,573,866 to Van Dine et al. teaches a polymer electrolyte membrane fuel cell which directly oxidizes liquid methanol fuel that is fed into the anode chamber from a liquid methanol storage container. The liquid methanol is mixed with water in the anode chamber. Some of the methanol and water cross over the membrane into the cathode chamber and into a process air stream. The methanol and water are removed from the cathode chamber by evaporation into the process air stream, which is then directed into a condenser/radiator. The methanol and water vapors are condensed in the condenser/radiator, from whence the condensed water and methanol are returned to the anode chamber of the cell. The evaporating cathode process air stream, which is provided to the cathode chamber by means of a fan, provides oxygen for the fuel cell reaction, and also cools the cell. See also U.S. Pat. No. 4,390,630 to Kawana et al. which also teaches a methanol fuel cell. It will be appreciated that, to the extent direct methanol fuel cells require the use of external devices for operation, such as fans, blowers and humidifiers, they are not suitable for use in vehicular applications or as a replacement for rechargeable batteries.

SUMMARY OF THE INVENTION

Accordingly, it is one object of this invention to provide a polymer electrolyte membrane fuel cell suitable for generating electricity by direct oxidation of methanol that does not require the use of external means for providing oxidant to the fuel cell and/or removing water from the fuel cell. More particularly, it is one object of this invention to provide an electricity-producing, self-sustaining direct methanol polymer electrolyte membrane fuel cell.

It is another object of this invention to provide a method for generating electricity by direct oxidation of methanol that eliminates the need for auxiliary equipment such as fans, blowers and/or humidifiers for delivery to the fuel cell and removal from the fuel cell of reactants and reaction products, respectively.

These and other objects of this invention are addressed by an apparatus for generating electricity comprising an enclosure suitable for containment of a liquid hydrocarbon fuel and at least one air-breathing polymer electrolyte membrane fuel cell unit disposed in a wall of the enclosure with an anode side facing an interior of the enclosure. The at least one air-breathing polymer electrolyte membrane fuel cell unit comprises a polymer electrolyte membrane having an anode side and a cathode side, an anode electrode disposed on the anode side of the polymer electrolyte membrane and a cathode electrode disposed on the cathode side of the polymer electrolyte membrane. A porous metal cathode current collector having a centrally disposed active region is disposed on the cathode side of the polymer electrolyte membrane and a porous metal anode current collector is disposed on the anode side of the polymer electrolyte membrane. In accordance with a particularly preferred embodiment of this invention, the porous metal cathode current collector and the porous anode current collector are made from a foam metal. As will be shown, critical to the operation of the polymer electrolyte membrane fuel cell of this invention without the need for auxiliary pumps, fans, humidifiers, etc. are the porosity and pore sizes of the porous current collectors.

In accordance with one embodiment of the method of this invention, methanol is supplied through a porous anode current collector of a polymer electrolyte membrane fuel cell to the anode electrode and oxidant is supplied at substantially atmospheric pressure by means of diffusion through a porous cathode current collector to the cathode electrode of the polymer electrode membrane fuel cell. The methanol is directly oxidized in the fuel cell, resulting in the generation of water, carbon dioxide and electricity. The water generated in the fuel cell diffuses out of the fuel cell through the porous cathode current collector. In operation, there exists substantially no pressure differential between the anode side and the cathode side of the polymer electrolyte membrane fuel cell.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

Figure 1:
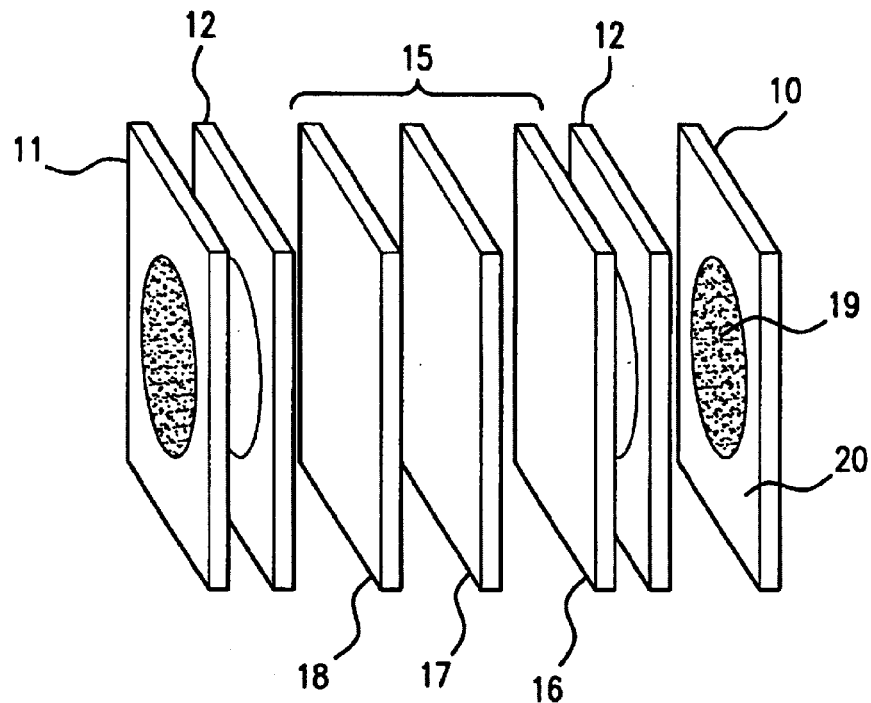
FIG. 1 is a diagram showing the components of a direct methanol fuel cell in accordance with one embodiment of this invention.

The apparatus for generating electricity in accordance with this invention is an air-breathing direct methanol fuel cell unit and air-breathing direct methanol fuel cell assembly or pack. As used herein, the term "air-breathing" refers to the ability to take in air or other oxidant at substantially atmospheric pressure without employing auxiliary pumps, fans, humidifiers, etc. As shown in FIG. 1, each direct methanol fuel cell in accordance with this invention comprises a membrane-electrode assembly or MEA 15, which membrane-electrode assembly comprises a polymer electrolyte membrane 17 disposed between an anode electrode 18 and a cathode electrode 16, an anode current collector 11 and a cathode current collector 10. The key to this invention is the use of special metal foams as the current collector at the cathode electrode. In addition to functioning as a current collector, the special metal foam also acts as an air diffuser. In particular, the cathode current collector 10 acts as an air diffuser through which the amount of air required to operate the cell is delivered to the cathode electrode 16 and product water generated by the cell is removed. The cathode current collector 10 and the anode current collector 11 preferably are made of porous metal or metal alloy foam materials having a porosity preferably in the range of about 50% to about 95%. The pore sizes are in the range of about 10 to about 80 PPI, which pore sizes are critical to limiting methanol crossover. In accordance with one preferred embodiment of this invention, the current collectors are made of a porous material selected from the group consisting of porous Hastalloy C, nickel foam and stainless steel foam (available from Porvair, Hendersonville, N.C. 28792). These materials provide little resistance to the transfer of methanol solution to the anode electrode and air breathing to the cathode electrode. In addition, these materials are both corrosion resistant and electrically conductive.

In accordance with one embodiment of this invention, the peripheral areas of the foam current collectors are densified and sealed using commercially available silicone to form a gasket area 20. The gasket area 20 generally conforms to the area of the gasket 12, which provides sealing around the periphery of the membrane electrode assembly 15. One suitable material for producing gasket 12 is a commercially available ethylene styrene copolymer polymer, such as SENFLEX® T-1210 and SENFLEX® T-650 available from SENTINEL Polyolefins L.L.C., Hyannis, Mass. 02601. In accordance with one preferred embodiment of this invention, the anode electrode 18 comprises an anode catalyst comprising 40% Pt—Ru (1:1 molar ratio) on carbon black, which catalyst is CO-tolerant and the cathode electrode 16 comprises a cathode catalyst which is about 40% Pt at a loading of about 0.5 to about 1 Pt mg/cm$^2$.

In accordance with one embodiment of this invention, the electrodes 16, 18 are gas diffusion electrodes which are made using carbon cloth coated with a layer of carbon black and TEFLON emulsion. The carbon cloth is not teflonized, but it is sintered to be hydrophobic. The carbon black layer comprises about 30% by volume TEFLON emulsion so as to be hydrophobic. This gas diffusion electrode has a good and stable hydrophilicity/hydrophobicity ratio for the application in the direct methanol fuel cell of this invention. Details for producing suitable gas diffusion electrodes can be found in pending U.S. patent application Ser. No. 09/768,531, which is incorporated by reference herein in its entirety.

The current collector materials are selected based upon their conductivity, corrosion rate and porosity. The metal foam is pressed around the periphery to leave a centrally disposed active area 19. This pressed area 20 is used for gasketing. When assembled, the direct methanol fuel cell of this invention comprises a membrane electrode assembly 15 sandwiched between two metal foam layers 10, 11, making assembly simple, because the metal foam layers function as a current collector, MEA supporter and, in the case of the cathode current collector 10, an air diffuser.

Figure 2:
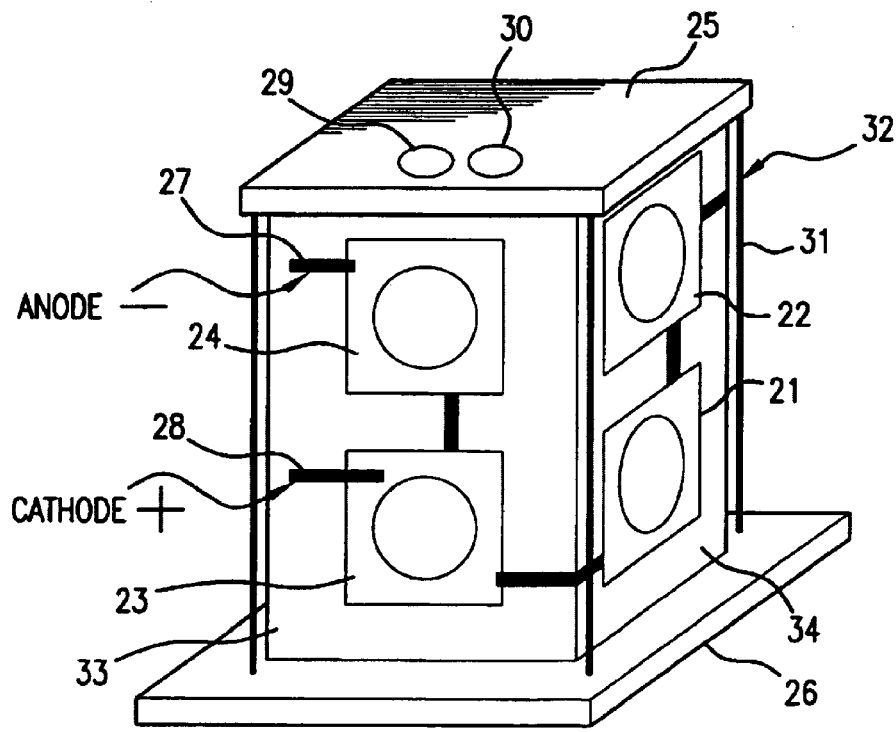
FIG. 2 is a diagram of an air breathing direct methanol fuel cell in accordance with one embodiment of this invention.

FIG. 2 shows an exemplary direct methanol fuel cell assembly comprising eight direct methanol fuel cell units, only four of which are shown (21, 22, 23 and 24). The direct methanol fuel cell assembly comprises a housing 32 in which the methanol solution is disposed. The walls 25, 26, 33, 34 of the housing form at least one opening sized to accommodate at least one direct methanol fuel cell unit. A methanol solution is disposed within the interior of the direct methanol fuel cell assembly at least at a level sufficient to contact the active region of the anode electrodes of the fuel cell units. As shown in FIG. 2, the housing 32 forms openings 29, 30 through which methanol solution is introduced into the housing 32 and product gases are exhausted from the housing. In accordance with one preferred embodiment of this invention, the methanol solution comprises at least one addictive suitable for preventing impurities that may be present in the solution from passing into the active regions of the fuel cell units. One such additive suitable for this purpose is iso-propanol, available from Aldrich Chemicals.

Figure 6:
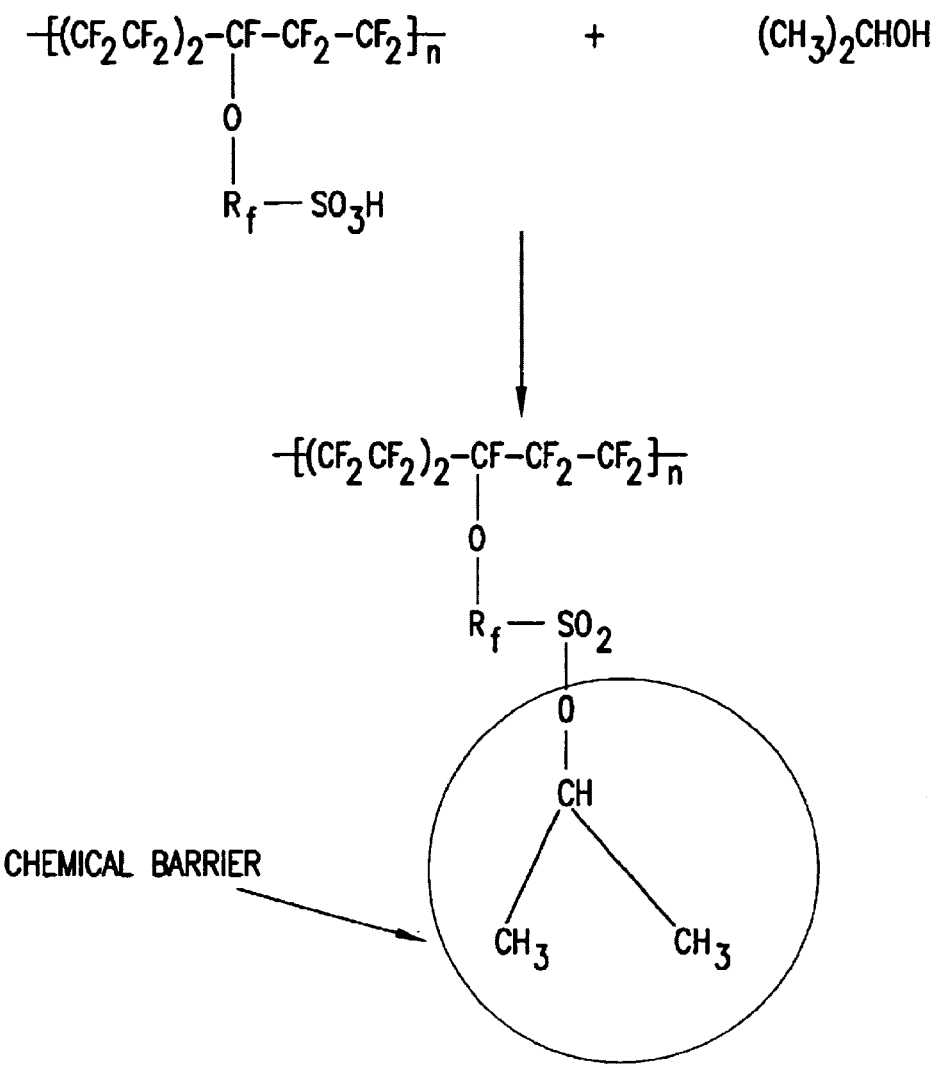
FIG. 6 is a diagram showing a possible reaction scheme for formation of a chemical barrier which reduces methanol crossover.

The idea is to add additives in the methanol solution. A condensation reaction of an alcohol with an acid to produce an ester and water; e.g. $CH_3OH + C_6H_5COOH \rightleftharpoons CH_3OOCC_6H_5 + H_2O$. The reaction is an equilibrium and is slow under normal conditions, but can be speeded up by the addition of a strong acid catalyst. Nafion is a fluoro-sulfuric acid, which reacts with methanol to form an ester. This reaction is slow; however, in the Nafion membrane, due to the high concentration of acid, the reaction could be fast. In the direct methanol fuel cell, methanol crossover is one factor that reduces the cell performance. That methanol reacts with Nafion and stays in the Nafion are other reasons to increase the cell IR. The condensation reaction is inevitable in the direct methanol fuel cell; however, we use the condensation reaction to form a chemical barrier, which reduces methanol crossover. A reaction scheme for chemical barrier formation is shown in FIG. 6. IPP is a three-carbon molecule, which is very difficult to oxidize to carbon dioxide and water. This "T" shape chemical barrier occupies sites, on which methanol molecules may sit. Other molecules, such as ethylene glycol, butanol, etc. are also candidates for the chemical barrier. However, physical properties, such as viscosity and solubility must be considered. The properties of the additives must be stable, not poison the catalysts, and also not restrict proton movements. The chemical barrier has equilibrium in the methanol solution, but is not consumed. Therefore in the direct methanol fuel cell, the methanol is the fuel to be consumed.

EXAMPLE

A direct methanol fuel cell assembly as shown in FIG. 2 was made having an active area of about 5 cm$^2$, providing about 1 W at 60° C. Performance of the assembly was 0.38 V/cell at 60 mA/cm$^2$. At room temperature, the performance of the assembly was 0.38 V/cell at 10 mA/cm$^2$. This direct methanol fuel cell assembly was able to run a 3 V transistor radio and is capable of running other low power systems as well.

Figure 3A:
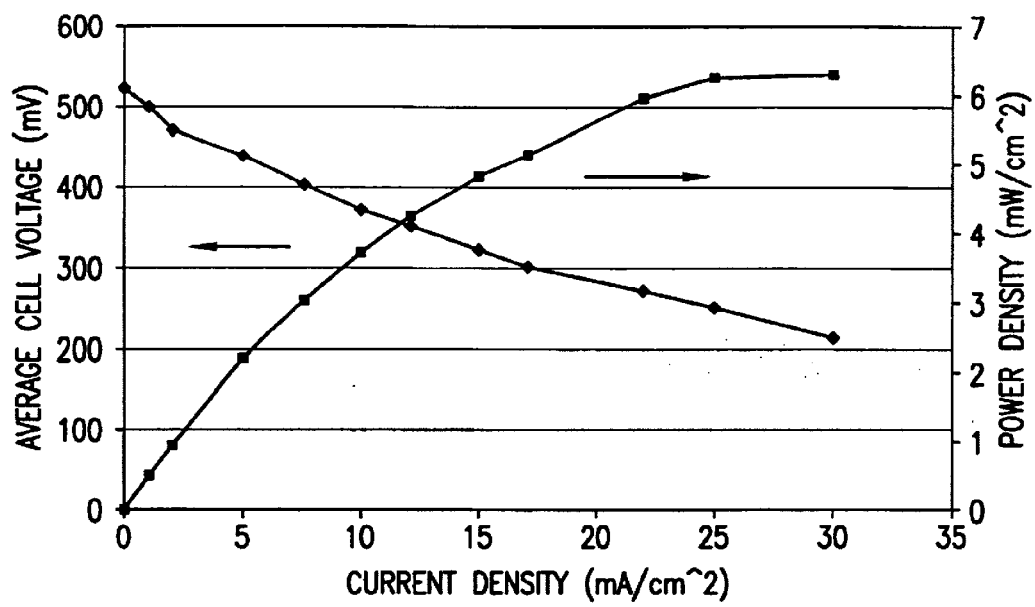
FIG. 3 is a diagram showing cell voltage and power density of the direct methanol fuel cells of this invention.
Figure 3B:
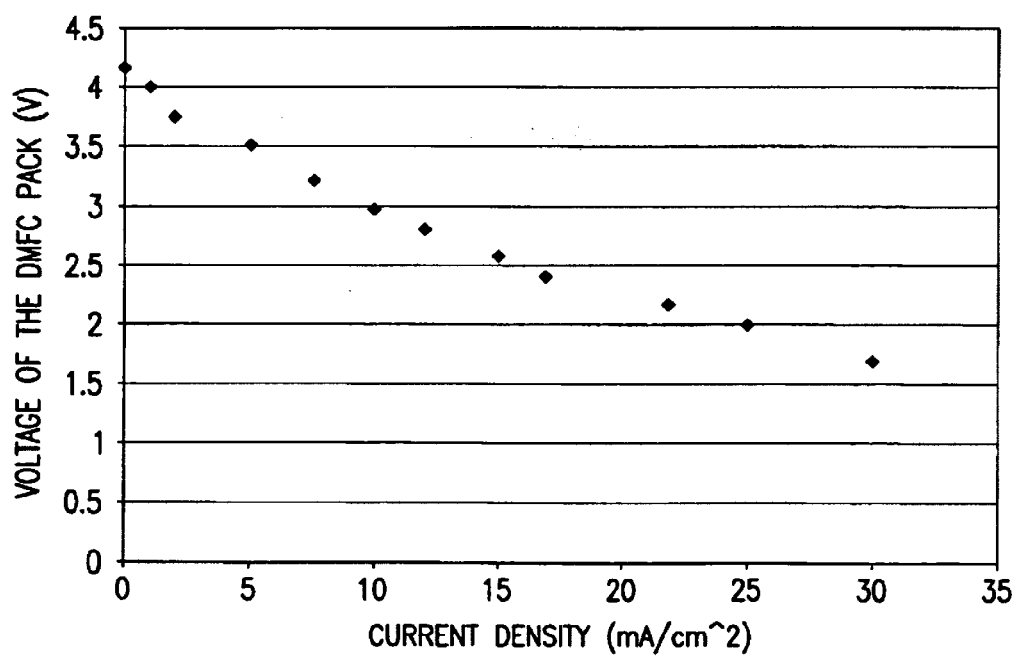

FIG. 3 is a diagram showing the polarization curve of a direct methanol fuel cell assembly or pack at room temperature in accordance with one embodiment of this invention. The cell pack performed at about 150 to 200 mW. Performance of the cell pack is highly dependent upon liquid temperature and methanol concentration. The temperature of the methanol solution is preferably in the range of about room temperature to about 100° C. while the methanol concentration in the solution is in the range of about 2% to about 20% by volume. The higher temperatures increase cell performance, as exemplified by a pack at 60° C. in which the pack power reaches 1 W. Methanol crossover is controlled by adjusting the methanol concentration and the cathode current collector pore size.

Figure 4:
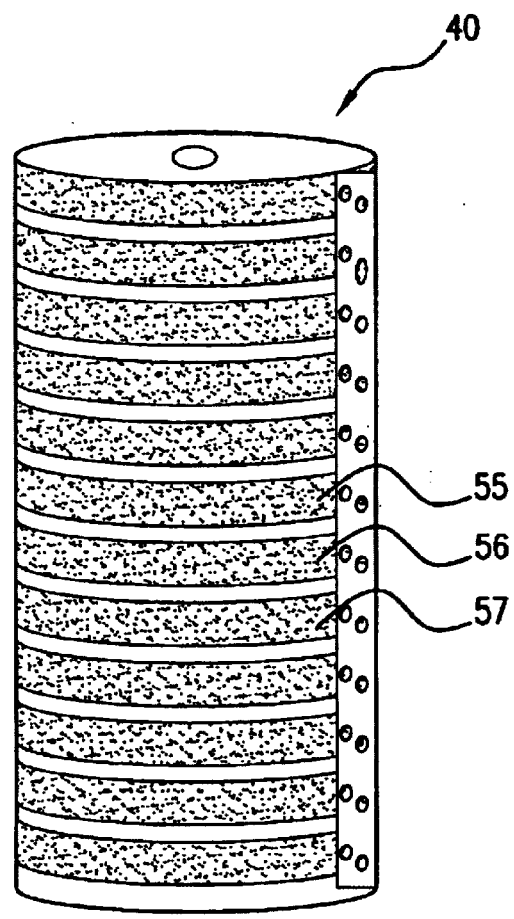
FIG. 4 is a diagram of a direct methanol fuel cell pack in accordance with one embodiment of this invention.
Figure 5:
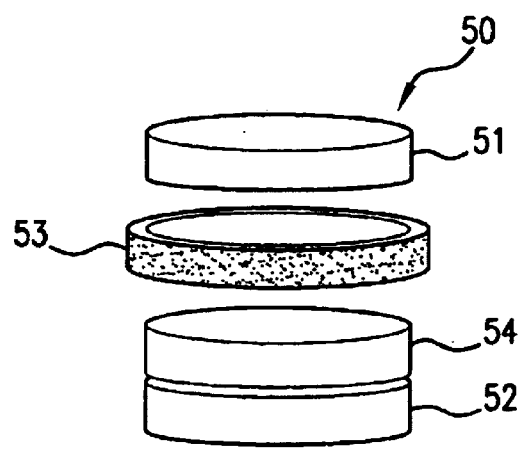
FIG. 5 is an exploded view of a direct methanol fuel cell from the direct methanol fuel cell pack of FIG. 4.

FIG. 4 is a diagram of a cylinder-shaped direct methanol fuel cell pack 40 in accordance with one embodiment of this invention having twelve direct methanol fuel cell units 55, 56, 57, one of which is shown in an exploded view in FIG. 5. The "striped" fuel cell unit is wrapped on a perforated plastic cylinder. In this embodiment, the anode current collector 54 was made with a perforated metal while the cathode current collector 53 was made with metal foam. As shown in the exploded view in FIG. 5, the fuel cell units of the fuel cell pack are separated by plastic elements 51, 52. It will be apparent to those skilled in the art that the simplicity of the air breathing direct methanol fuel cell units of this invention provides the possibility for fuel cell packs having a variety of shapes, in addition to the rectangular and cylinder-shaped packs described herein, and all such shapes are deemed to be within the scope of this invention.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. An apparatus for generating electricity comprising:
an enclosure suitable for containment of a liquid hydrocarbon fuel;
at least one air-breathing direct liquid hydrocarbon fuel polymer electrolyte membrane fuel cell unit disposed in a wall of said enclosure with an anode side-facing an interior of said enclosure and a cathode side facing an exterior of said enclosure; and
a cathode electrode assembly disposed on said cathode side, said cathode electrode assembly comprising a cathode electrode and a foam metal cathode current collector.

2. An apparatus in accordance with claim 1, wherein a liquid hydrocarbon fuel is disposed in said enclosure at a level sufficient to contact an active region of an anode electrode of said at least one air-breathing direct liquid hydrocarbon fuel polymer electrolyte membrane fuel cell unit.

3. An apparatus in accordance with claim 2, wherein said liquid hydrocarbon fuel is mixed with water to form a liquid hydrocarbon fuel solution.

4. An apparatus in accordance with claim 3, wherein said liquid hydrocarbon fuel solution comprises at least one additive suitable for preventing impurities which may be present in said liquid hydrocarbon fuel solution from passing into said active region of said at least one air-breathing direct liquid hydrocarbon fuel polymer electrolyte membrane fuel cell unit.

5. An apparatus for generation of electricity comprising:
a polymer electrolyte membrane having an anode side and a cathode side;
an anode electrode disposed on said anode side and a cathode electrode disposed on said cathode side;
a porous metal anode current collector having a centrally disposed active region disposed on said anode side; and
a porous metal cathode current collector comprising a foam metal and having a centrally disposed active region disposed on said cathode side.

6. An apparatus in accordance with claim 5, wherein a periphery of each of said anode current collector and said cathode current collector is densified, forming a peripheral gasket area.

7. An apparatus in accordance with claim 5, wherein said porous metal is selected from the group consisting of Hastelloy C, Ni, stainless steel and alloys thereof.

8. An apparatus in accordance with claim 5, wherein said anode electrode comprises an anode catalyst comprising 40% Pt—Ru and said cathode electrode comprises a cathode catalyst comprising about 40% Pt at a loading in a range of about 0.5 to about 1.0 Pt mg/cm$^2$.

9. An apparatus in accordance with claim 5, wherein a porosity of said porous metal cathode collector is in a range of about 50% to about 95%.

10. An apparatus in accordance with claim 5, wherein said porous metal cathode current collector has a mean pore size in a range of about 10 to about 80 PPI.

11. An apparatus for generation of electricity comprising:
a membrane-electrode assembly having an anode side and a cathode side;
a porous metal anode current collector disposed on said anode side; and
a porous metal cathode current collector comprising a foam metal and having a centrally disposed active region having a porosity in a range of about 50% to about 95% disposed on said cathode side.

12. An apparatus in accordance with claim 11, wherein a catalyst is disposed on at least one of said anode side and said cathode side, said catalyst having a catalyst loading in a catalyst loaded range of about 0.5 to about 1.0 Pt mg/cm$^2$.

13. An apparatus in accordance with claim 11, wherein said foam metal is selected from the group consisting of Hastelloy C, Ni, stainless steel and alloys thereof.

14. An apparatus in accordance with claim 11, wherein a periphery of at least one of said porous metal current collectors is densified, forming a peripheral gasket region.

15. An apparatus for generation of electricity comprising:
a direct methanol polymer electrolyte membrane fuel cell assembly comprising a plurality of electrically connected fuel cell units, each said fuel cell unit comprising a membrane-electrode-assembly having an anode side and a cathode side and a foam metal cathode current collector having a centrally disposed active region having a porosity in a range of about 50% to about 95% disposed on said cathode side.

16. An apparatus in accordance with claim 15, wherein said foam metal is selected from the group consisting of Hastelloy C, Ni, stainless steel and alloys thereof.

17. An apparatus in accordance with claim 15, wherein said polymer electrolyte membrane fuel cell assembly has a cylindrical shape.

18. An apparatus in accordance with claim 15, wherein said polymer electrolyte membrane fuel cell assembly has a three-dimensional rectangular shape.

19. An apparatus for generation of electricity comprising:
a membrane-electrode-assembly having an anode side and a cathode side; and
oxidation means for providing an oxidizing agent at substantially atmospheric pressure to said membrane-electrode-assembly and directly oxidizing methanol at said substantially atmospheric pressure, said oxidation means comDrising a foam metal cathode current collector disposed on said cathode side.

20. In a polymer electrolyte membrane fuel cell comprising a polymer electrolyte membrane disposed between an anode electrode and a cathode electrode, a method for generating electricity comprising the steps of:

passing methanol through a porous anode current collector to contact said anode electrode;

passing an oxidant at atmospheric pressure through a porous foam metal cathode current collector to contact said cathode electrode; and directly oxidizing said methanol, producing water, carbon dioxide and electricity.

21. A method in accordance with claim 20, wherein said water diffuses out of said polymer electrolyte membrane fuel cell through said foam metal cathode current collector.

22. A method in accordance with claim 20, wherein there exists substantially no pressure differential between an anode side and a cathode side of said polymer electrolyte membrane fuel cell.

23. A method in accordance with claim 20, wherein said methanol is in solution.

24. A method in accordance with claim 23, wherein an amount of said methanol in said solution is in a range of about 2% to about 20% by volume of said solution.

25. A method in accordance with claim 23, wherein said solution further comprises a material whereby impurities in said solution are precluded from passing through said polymer electrolyte membrane.

26. A method in accordance with claim 25, wherein said material is iso-propanol.

* * * * *